(12) United States Patent
Ogushi (10) Patent No.: US 11,288,435 B1
(45) Date of Patent: Mar. 29, 2022

(54) FAILURE ANALYSIS APPARATUS, COMPUTER READABLE RECORDING MEDIUM AND FAILURE ANALYSIS METHOD

(71) Applicant: RENESAS ELECTRONICS CORPORATION, Tokyo (JP)

(72) Inventor: Toru Ogushi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/097,896

(22) Filed: Nov. 13, 2020

(51) Int. Cl.
| | |
|---|---|
| *G06F 30/392* | (2020.01) |
| *G06F 30/3308* | (2020.01) |
| *G06F 30/367* | (2020.01) |
| *G06F 30/398* | (2020.01) |
| *G06F 12/10* | (2016.01) |
| *G06F 119/02* | (2020.01) |

(52) U.S. Cl.
CPC ............ *G06F 30/392* (2020.01); *G06F 12/10* (2013.01); *G06F 30/3308* (2020.01); *G06F 30/367* (2020.01); *G06F 30/398* (2020.01); *G06F 2119/02* (2020.01); *G06F 2212/657* (2013.01)

(58) Field of Classification Search
CPC .. G06F 30/392; G06F 30/3308; G06F 30/367; G06F 30/398; G06F 12/10; G06F 2119/02; G06F 2212/657
USPC .................... 716/112, 106, 136, 119; 703/15
See application file for complete search history.

(56) References Cited

U.S. PATENT DOCUMENTS

| | | | | | |
|---|---|---|---|---|---|
| 6,128,684 | A | * | 10/2000 | Okayama | ............ G06F 12/1027 710/109 |
| 6,321,276 | B1 | * | 11/2001 | Forin | ..................... G06F 11/141 710/3 |
| 7,739,474 | B2 | * | 6/2010 | Engbersen | .......... G06F 12/1483 711/203 |
| 2008/0005297 | A1 | * | 1/2008 | Kjos | .................... G06F 9/45558 709/223 |
| 2010/0274876 | A1 | * | 10/2010 | Kagan | ................. G06F 12/1072 709/221 |
| 2012/0239372 | A1 | * | 9/2012 | Kruus | ...................... G06F 30/33 703/17 |
| 2013/0042242 | A1 | * | 2/2013 | Kagan | ................... G06F 9/4812 718/1 |

(Continued)

FOREIGN PATENT DOCUMENTS

JP   2003-045922 A   2/2003

*Primary Examiner* — Phallaka Kik
(74) *Attorney, Agent, or Firm* — McDermott Will & Emery LLP (57) ABSTRACT

A failure analysis apparatus is an apparatus for analyzing a failure of a semiconductor device including a memory circuit and includes a storage device and a processor. The storage device stores EDA data including size values of a memory cell in the memory circuit, size values of a peripheral circuit in the memory circuit and arrangement spacing values of the peripheral circuit, and layout data of the semiconductor device. The processor converts logical addresses and I/O value of a fail bit obtained by testing the memory circuit into physical addresses using predetermined arithmetic expressions, and converts the physical addresses into physical coordinate values using the size values of the memory cell, the size values of the peripheral circuit, and the arrangement spacing values of the peripheral circuit.

15 Claims, 10 Drawing Sheets

(56) References Cited

U.S. PATENT DOCUMENTS

| | | | | |
|---|---|---|---|---|
| 2019/0042461 A1* | 2/2019 | Vakharwala | .......... | G06F 3/0614 |
| 2019/0310947 A1* | 10/2019 | Raisch | ................ | G06F 9/45504 |
| 2020/0065134 A1* | 2/2020 | Iyer | .................... | G06F 9/30098 |
| 2020/0409604 A1* | 12/2020 | Tajima | .................. | G06F 3/0622 |

* cited by examiner

| 452 | 455 | 500 325: PHYSICAL COORDINATE VALUE DATA | 321a | 501 |
|---|---|---|---|---|
| TYPE ID | INSTANCE ID | PHYSICAL COORDINATE VALUES | MEMORY CIRCUIT DATA | PHYSICAL ADDRESSES |
| TID1 | IID1 | (XFmn1, YFmn1) - (XFmx1, YFmx1) | ... | (PADx1, PADy1) |
| TID1 | IID1 | (XFmn2, YFmn2) - (XFmx2, YFmx2) | ... | (PADx2, PADy2) |
| TID1 | IID2 | (XFmn3, YFmn3) - (XFmx3, YFmx3) | ... | (PADx3, PADy3) |
| ... | ... | ... | ... | ... |

FAILURE ANALYSIS APPARATUS, COMPUTER READABLE RECORDING MEDIUM AND FAILURE ANALYSIS METHOD

BACKGROUND

The present disclosure relates to a failure analysis apparatus, a computer readable recording medium, and a failure analysis method.

There is a disclosed technique listed below.
[Patent Document 1] Japanese Unexamined Patent Application Publication No. 2003-045922

Patent Document 1 discloses a device failure analysis apparatus to improve the efficiency of failure analysis. The device failure analysis apparatus causes a display means to display a fail bit map obtained by a test. When any failure portion is selected in the display, the device failure analysis apparatus converts the failure address of the failure portion into location information in the physical space coordinate. Further, the device failure analysis apparatus selectively reads out Computer-Aided Design (CAD) data corresponding to the physical space coordinate and causes the display means to display the CAD data.

SUMMARY

For example, if a memory cell in a memory circuit fails during testing, physical analysis such as Scanning Electron Microscope (SEM) analysis and nano-prober analysis may be performed on the semiconductor chip to identify the cause of the failure. For this purpose, it is required to specify the location of the fail bit, which is a failing memory cell, in the semiconductor chip with high accuracy. Patent Document 1 describes, for example, converting a fail address of a fail bit into location information in the physical space coordinate.

Generally, if the fail address of the fail bit is known, it is possible to roughly narrow down the location of the fail bit in the semiconductor chip. Thus, using the technique of Patent Document 1, rough layouts around the fail bit can be displayed. On the other hand, the exact location of the fail bit can be appropriately changed in accordance with, for example, an arrangement method of various peripheral circuits in the memory circuit. Therefore, even when the technique of Patent Document 1 is used, in particular, when performing the physical analysis as described above, the user needs to manually specify the exact location of the fail bit from the rough layouts.

Other objects and new features will be apparent from the description of this specification and the accompanying drawings.

Therefore, a failure analysis apparatus according to one embodiment is an apparatus for analyzing a failure of a semiconductor device including a memory circuit and includes a storage device and a processor. The storage device stores Electronic Design Automation (EDA) data including size values of a memory cell in the memory circuit, size values of a peripheral circuit in the memory circuit and arrangement spacing values of the peripheral circuit, and the layout of the semiconductor device. The processor converts logical addresses and an Input/Output (I/O) value of the fail bit obtained by testing the memory circuit into physical addresses using predetermined arithmetic expressions, and converts the physical addresses into physical coordinate values using the size values of the memory cell, the size values of the peripheral circuit and the alignment spacing values of the peripheral circuit.

By using the failure analysis apparatus according to one embodiment, it is possible to improve the efficiency of the failure analysis.

DETAILED DESCRIPTION

In the following embodiments, when required for convenience, the description will be made by dividing into a plurality of sections or embodiments, but except when specifically stated, they are not independent of each other, and one is related to the modified example, detail, supplementary description, or the like of part or all of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle. Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

Figure 1:
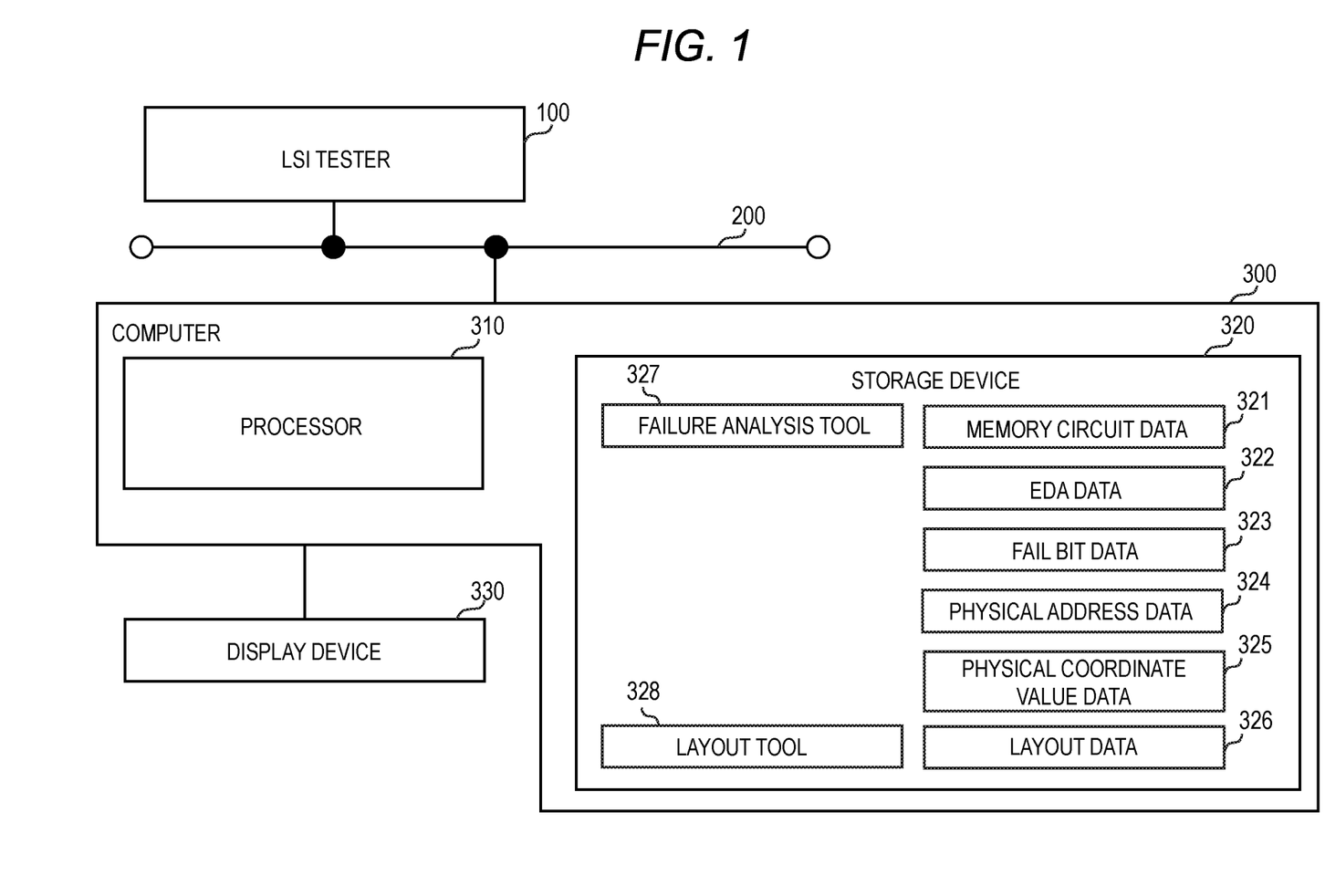
FIG. 1 is a schematic diagram showing an example of a configuration of a failure analysis system according to a first embodiment of the present disclosure.

Hereinafter, embodiments will be described in detail with reference to the drawings. In all the drawings for explaining the embodiments, members having the same functions are denoted by the same reference numerals, and repetitive descriptions thereof are omitted. In the following embodiments, descriptions of the same or similar parts will not be repeated in principle except when particularly necessary.

First Embodiment Configuration of Failure Analysis System FIG. 1 is a schematic diagram showing an example of a configuration of a failure analysis system according to a first embodiment of the present disclosure. The Failure analysis system shown in FIG. 1 includes a Large-Scale Integration (LSI) tester 100, a communication network 200, a computer 300, and a display device 330. The LSI tester 100 is, for example, a memory tester. The LSI tester 100 tests a memory circuit included in a semiconductor device and outputs the test conditions and the data of the fail bit, which is one of the test results. The communication network 200 is, for example, a wired Local Area Network (LAN) or a wireless LAN and connects the LSI tester 100 and the computer 300.

The computer 300 includes a processor 310 and a storage device 320, and the storage device 320 is configured by, for example, a combination of a non-volatile storage device such as a hard disk drive, a Solid State Drive (SSD) and a flash memory, and a volatile storage device such as a Random Access Memory (RAM). The storage device 320 stores a failure analysis tool 327 and a layout tool 328, which are programs. In addition, the storage device 320 stores memory circuit data 321, EDA data 322, fail bit data 323, physical address data 324, physical coordinate value data 325, and layout data 326, which are data.

Details of Failure Analysis Apparatus

Figure 2:
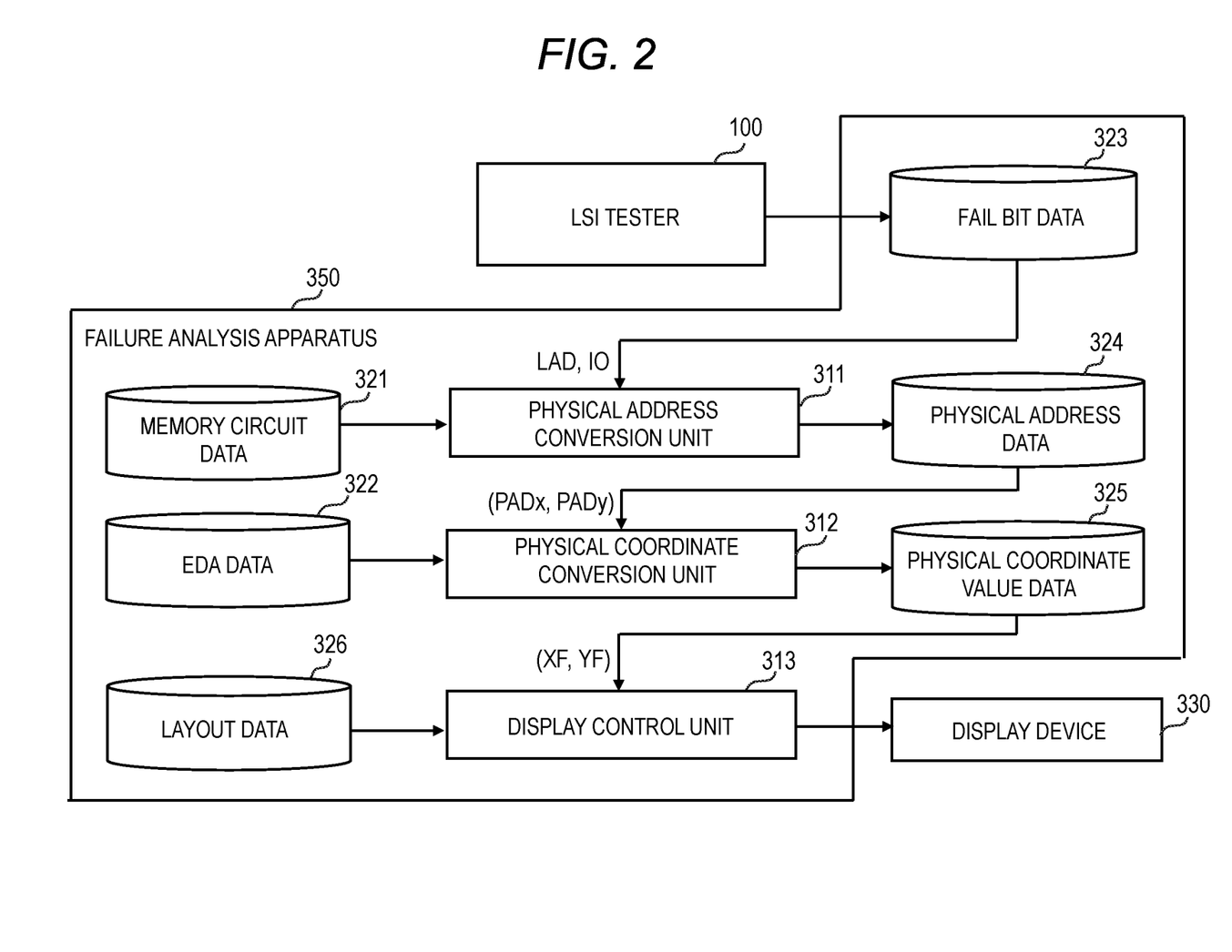
FIG. 2 is a functional block diagram showing an example of a configuration of a failure analysis apparatus realized using the configuration of FIG. 1.

FIG. 2 is a functional block diagram showing an example of a configuration of a failure analysis apparatus realized using the configuration of FIG. 1. The failure analysis apparatus 350 shown in FIG. 2 is an apparatus that analyzes a failure of a semiconductor device including a memory circuit. The failure analysis apparatus 350 includes a physical address conversion unit 311, a physical coordinate conversion unit 312, and a display control unit 313. The physical address conversion unit 311 and the physical coordinate conversion unit 312 are realized, for example, by the processor 310 of FIG. 1 executing the failure analysis tool 327 stored in the storage device 320. The display control unit 313 is realized, for example, by the processor 310 of FIG. 1 executing the layout tool 328 stored in the storage device 320.

In addition, the failure analysis apparatus 350 holds the memory circuit data 321, the EDA data 322, the layout data 326, the fail bit data 323, the physical address data 324, and the physical coordinate data 325 shown in FIG. 1. The fail bit data 323 is generated by the LSI tester 100. The fail bit data 323 includes test conditions and test results. The test conditions include a type ID and an instance ID for distinguishing the memory circuit to be tested. The test results include logical addresses LAD and an I/O value IC of the fail bit in the memory circuit.

Here, the type ID distinguishes the circuit configuration and the layout configuration of the memory circuit. The memory circuits having the same type ID have the same circuit configuration and the same layout configuration. The instance ID distinguishes the individual memory circuits. For example, when a plurality of memory circuits is mounted on one semiconductor device, the individual memory circuits are distinguished by the instance IDs.

The physical address conversion unit 311 converts the logical addresses LAD and the I/O value IO of the fail bit included in the fail bit data 323 obtained by testing the memory circuit into physical addresses (PADx, PADy) using predetermined arithmetic expressions. PADx is a physical address in the row direction, and PADy is a physical address in the column direction. In the specification, PADx and PADy are collectively referred to as physical addresses PAD.

The physical address conversion unit 311 refers to the memory circuit data 321 upon conversion to the physical address PADx. The memory circuit data 321 includes, for example, basic configuration information for each type ID of the memory circuit, the arithmetic expressions used for converting the logical addresses LAD into the physical addresses PAD for each type ID, and the like. The basic configuration information includes, for example, information such as the capacity of the memory circuit, the number of addresses in the row direction, the number of addresses in the column direction, the number of I/Os, and the presence or absence of a redundant circuit.

The physical address conversion unit 311 acquires the arithmetic expressions from the memory circuit data 321 based on, for example, the type ID included in the fail bit data 323, and calculates the physical addresses PAD of the fail bit using the arithmetic expressions. The arithmetic expressions include an arithmetic expression for calculating the physical address PADx in the row direction and an arithmetic expression for calculating the physical address PADy in the column direction. The physical address conversion unit 311 generates physical address data 324 indicating a correspondence relationship between the calculated physical addresses PAD, and the type ID and the instance ID.

The physical addresses PAD are addresses allocated based on the arrangement order on the layout of a plurality of memory cells in the memory circuit. For example, the physical addresses PADy in the column direction of the four memory cells sequentially arranged in the column direction on the layout are PADy=0, PADy=1, PADy=2, PADy=3, and the like in this order. On the other hand, in the memory circuit, the allocation method of the I/O value IO and the logical addresses LAD to a plurality of memory cells arranged in order on the layout differs for each type ID.

For example, in a memory circuit of a certain type ID, four memory cells sequentially arranged in the column direction are sequentially allocated to IO=0&LAD=0, IO=0&LAD=1, IO=1&LAD=0, and IO=1&LAD=1. On the other hand, in the memory circuit of another type ID, the four memory cells are sequentially allocated to IO=0&LAD=0, IO=1&LAD=0, IO=0&LAD=1, and IO=1&LAD=1.

As a result, for example, when the fail bit is IO=0&LAD=1, the physical address PADy in the column direction of the fail bit is PADy=1 in the memory circuit of one type ID and PADy=2 in the memory circuit of another type ID. Therefore, the physical address conversion unit 311 converts the I/O value IO and the logical addresses LAD into the physical addresses PAD using the arithmetic expressions for each type ID so that the physical address PADy in the column direction can be correctly obtained for each type ID.

By calculating the physical addresses PAD in this way, it is possible to roughly obtain the coordinate values on the layout of the memory cell corresponding to the fail bit. However, the memory circuit includes a peripheral circuit in detail and the layout of the peripheral circuit may be different for each type ID. Further, the size values of the memory cell may be different for each type ID. The exact coordinate values of the fail bit may then vary depending on the layout of this peripheral circuit and the size values of the memory cell.

Therefore, the physical coordinate conversion unit 312 converts the physical addresses (PADx, PADy) converted by the physical address conversion unit 311 into the physical coordinate values (XF, YF) using the data of the memory cell and the data of the peripheral circuit included in the EDA data 322. The physical coordinate values (XF, YF) are coordinate values on the layout of the semiconductor device, and are coordinate values handled by the layout tools 328 of FIG. 1. XF is a physical coordinate value in the row direction, and YF is a physical coordinate value in the column direction.

The EDA data 322 mainly includes various data related to the layout of the memory circuit and is generated in advance at the design stage of the semiconductor device. The physical coordinate conversion unit 312 generates the physical coordinate value data 325 indicating a correspondence relationship between the physical coordinate values (XF, YF) converted using the EDA data 322, and the type ID and the instance ID.

The display control unit 313 causes the display device 330 to display the layout of the semiconductor device based on the layout data 326. Further, the display control unit 313 adds a mark of the fail bit to the physical coordinate values (XF, YF) in the layout of the semiconductor device based on the physical coordinate values (XF, YF) converted by the physical coordinate transformation unit 312. The layout data 326 is generated in advance at the design stage of the semiconductor device. Details of the physical coordinate conversion unit 312 and the display control unit 313 will be described later.

Figure 3:
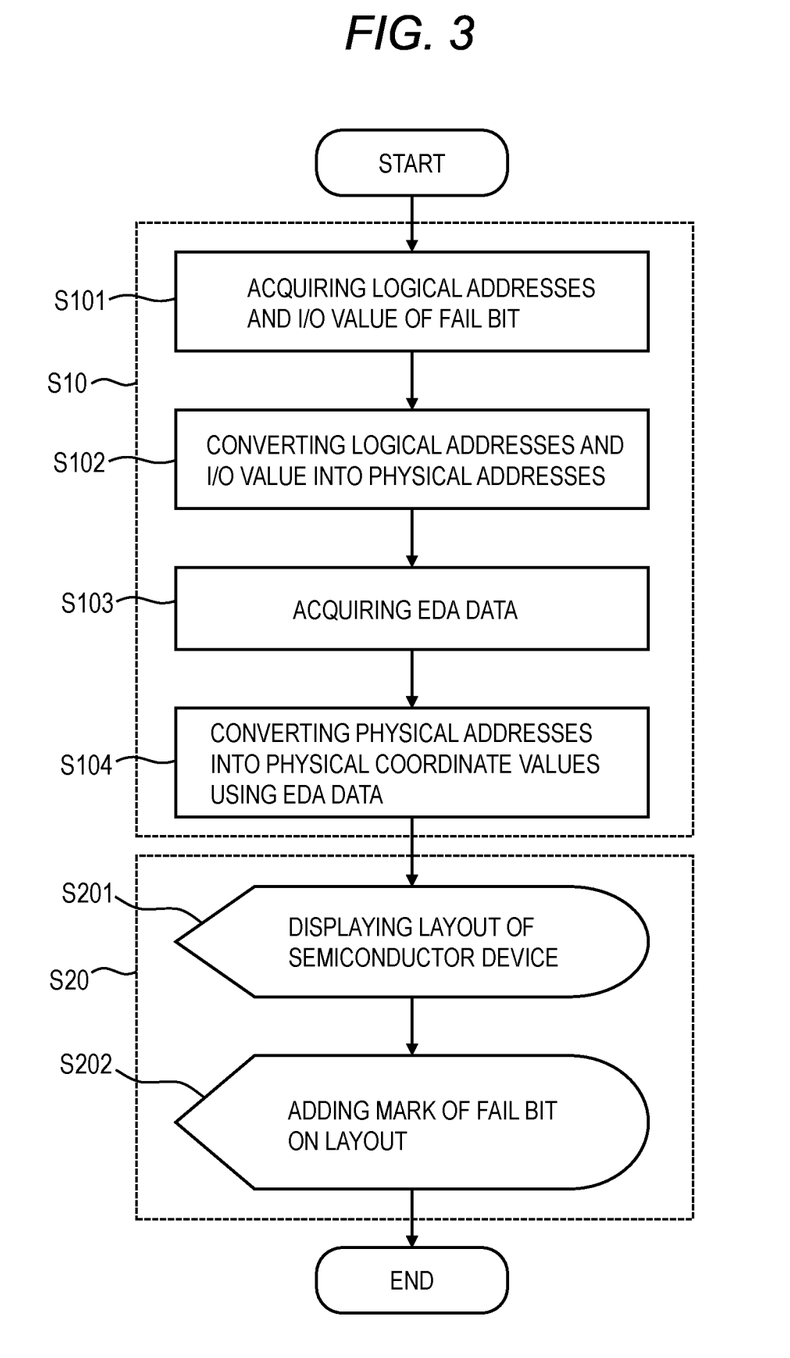
FIG. 3 is a flowchart showing an example of processing of the failure analysis apparatus of FIG. 2.

FIG. 3 is a flowchart showing an example of processing of the failure analysis apparatus of FIG. 2. In FIG. 3, a step S10 is processing based on the failure analysis tool 327 of FIG. 1, and a step S20 is processing based on the layout tool 328 of FIG. 1. The failure analysis tools 327 is a program for causing the processor 310 to execute processing of analyzing a failure of the semiconductor device including the memory circuit.

The failure analysis tool 327 may be stored on a non-transitory tangible computer readable recording medium and then supplied to a computer. Examples of such recording media include magnetic recording media typified by hard disk drives and the like, optical recording media typified by Digital Versatile Discs (DVDs), Blu-ray discs and the like, and semiconductor memories typified by flash memories and the like.

In FIG. 3, the physical address conversion unit 311 first acquires the logical addresses LAD and the I/O value IC of the fail bit obtained by testing the memory circuit based on the fail bit data 323 (step S101). Subsequently, the physical address conversion unit 311 converts the acquired logical addresses LAD and the I/O value IC into the physical addresses (PADx, PADy) using predetermined arithmetic expressions (step S102). Thus, the physical addresses conversion unit 311 generates the physical address data 324.

Next, the physical coordinate conversion unit 312 acquires the EDA data 322 (step S103). The EDA data 322 includes the data of the memory cell in the memory circuit and the data of the peripheral circuit in the memory circuit. Subsequently, the physical coordinate conversion unit 312 converts the physical addresses (PADx, PADy) in the physical address data 324 into the physical coordinate values (XF, YF) using the data of the memory cell and the data of the peripheral circuit included in the acquired EDA data 322 (step S104). As a result, the physical coordinate conversion unit 312 generates the physical coordinate value data 325.

Thereafter, the display control unit 313 causes the display device 330 to display the layout of the semiconductor device based on the layout data 326 (step S201). Further, the display control unit 313 adds the mark of the fail bit to the physical coordinate values (XF, YF) in the layout of the semiconductor device based on the physical coordinate values (XF, YF) in the physical coordinate value data 325 (step S202).

The layout tool 328 for defining the processing of the steps S201 and S202 may be, for example, a common program used in a layout design of a semiconductor device. However, the layout tool 328 must correspond to the processing of the step S202. Since the layout tool 328 generally performs various processing based on the physical coordinate values, the layout tool 328 can also perform the processing of the step S202 by inputting the physical coordinate values (XF, YF).

Details of Physical Coordinate Conversion Unit

Figure 4:
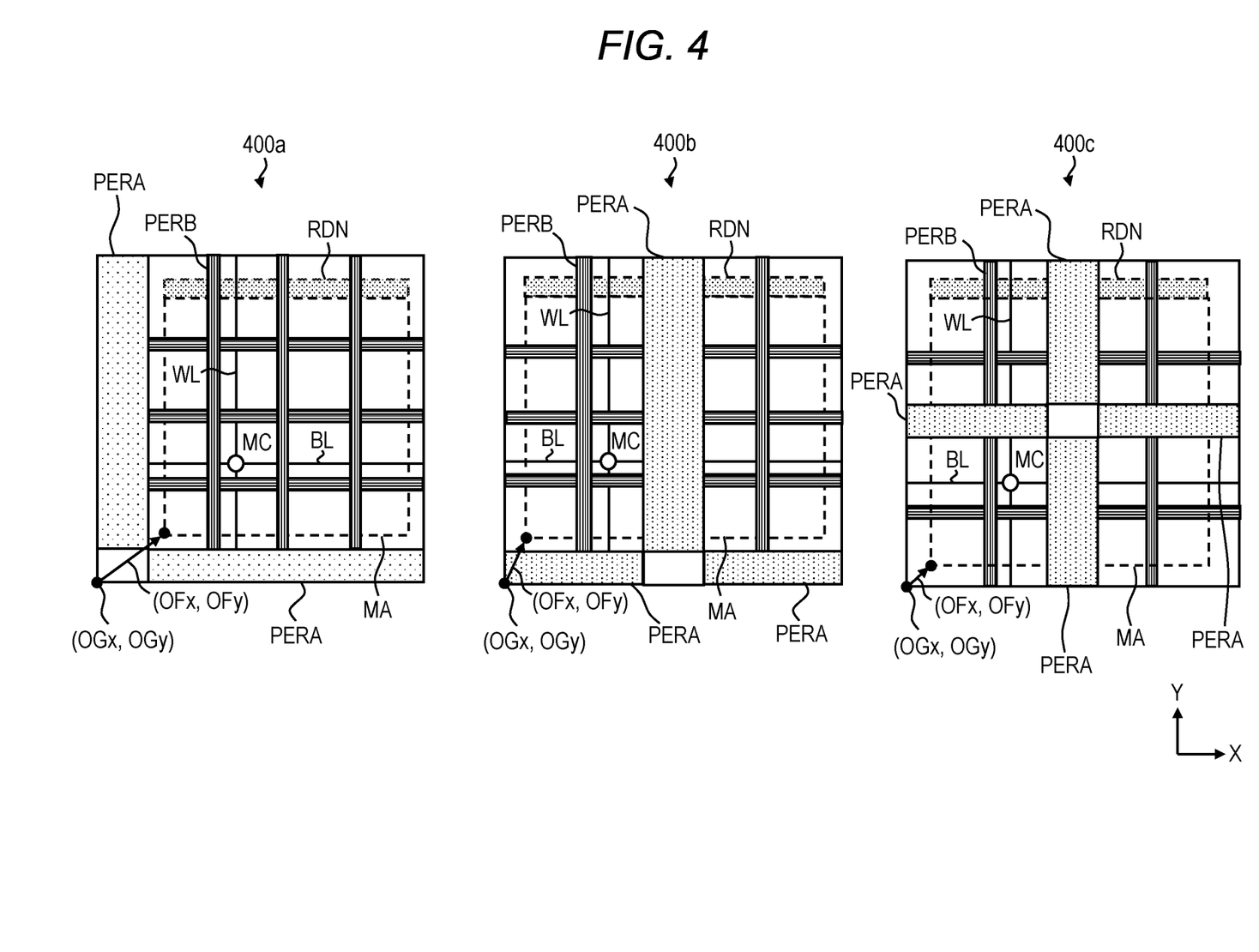
FIG. 4 is a schematic diagram showing an example of a layout configuration of a memory circuit to be analyzed by the failure analysis apparatus of FIG. 2.

FIG. 4 is a schematic diagram showing an example of a layout configuration of a memory circuit to be analyzed by the failure analysis apparatus of FIG. 2. FIG. 4 shows memory circuits having different type IDs, and shows an L-shaped memory circuit 400a, a T-shaped memory circuit 400b, and a cross-shaped memory circuit 400c. The memory circuits 400a, 400b, and 400c typically include large-scale peripheral circuits PERA and small-scale peripheral circuits PERB in addition to a memory array MA.

The memory array MA includes, for example, a plurality of word lines WL arranged side by side in the row direction, a plurality of bit lines BL arranged side by side in the column direction, and a memory cell MC arranged at an intersection point between the word line WL and the bit line BL. That is, the memory array MA includes a plurality of memory cells MC arranged in a matrix. In the specification, the row direction is the X-axis direction, and the column direction is the Y-axis direction. The memory array MA often includes a redundant circuit RDN including a repair memory cell for relieving the memory cell MC of the fail bit.

The large-scale peripheral circuits PERA include, for example, an address decoder, a word-line driver, a write driver, a sense amplifier, and the like, and control write and read operations of the memory cell MC. The small-scale peripheral circuits PERB are arranged so as to divide the memory array MA at regular intervals for the purpose of decentralization of voltage supply, etc. Specifically, the small-scale peripheral circuits PERB include, for example, a tap cell including a contact hole for supplying a power supply potential to a well region of a semiconductor substrate.

Here, the layouts of the large-scale peripheral circuits PERA are different from each other in the memory circuits 400a,400b, and 400c. That is, the large-scale peripheral circuits PERA are arranged in L-shaped, T-shaped, and cross-shaped shapes, respectively, in the memory circuits 400a,400b, and 400c. In addition, the arrangement spacing values of the small-scale peripheral circuits PERB and the like are different from each other in the memory circuits 400a,400b, and 400c. Further, although not shown, more particularly, in addition to such differences, for each type ID, the size values of the memory cell MC, the size values of the large-scale peripheral circuit PERA and the small-scale peripheral circuit PERB, and the like may be different. In accordance with such differences, the physical coordinate values of the memory cell MC corresponding to the fail bit may also change.

In addition, FIG. 4 shows origin coordinate values (OGx, OGy) and offset values (OFx, OFy). The origin coordinate values (OGx, OGy) indicate the coordinate values in which the memory circuit is arranged in the coordinate system of the semiconductor device. The offset values (OFx, OFy) indicate the coordinate values in which the memory array MA is arranged in the coordinate system of the memory circuit. Thus, the origin coordinate values (OGx, OGy) and the offset values (OFx, OFy) become reference coordinate values indicating the location of the memory array MA in the semiconductor device.

The reference coordinate values enable the individual locations to be distinguished, for example, even when a plurality of memory circuits and thus a plurality of memory arrays are arranged in the semiconductor device. Here, the coordinate values of the memory array MA arranged in the semiconductor device are indirectly indicated using the offset values (OFx, OFy) in the coordinate system of the memory circuit, but instead, it may be directly indicated using the coordinate system of the semiconductor device. In this instance, the location of the memory array MA in the semiconductor device can be indicated by a set of reference coordinate values.

Figure 5:
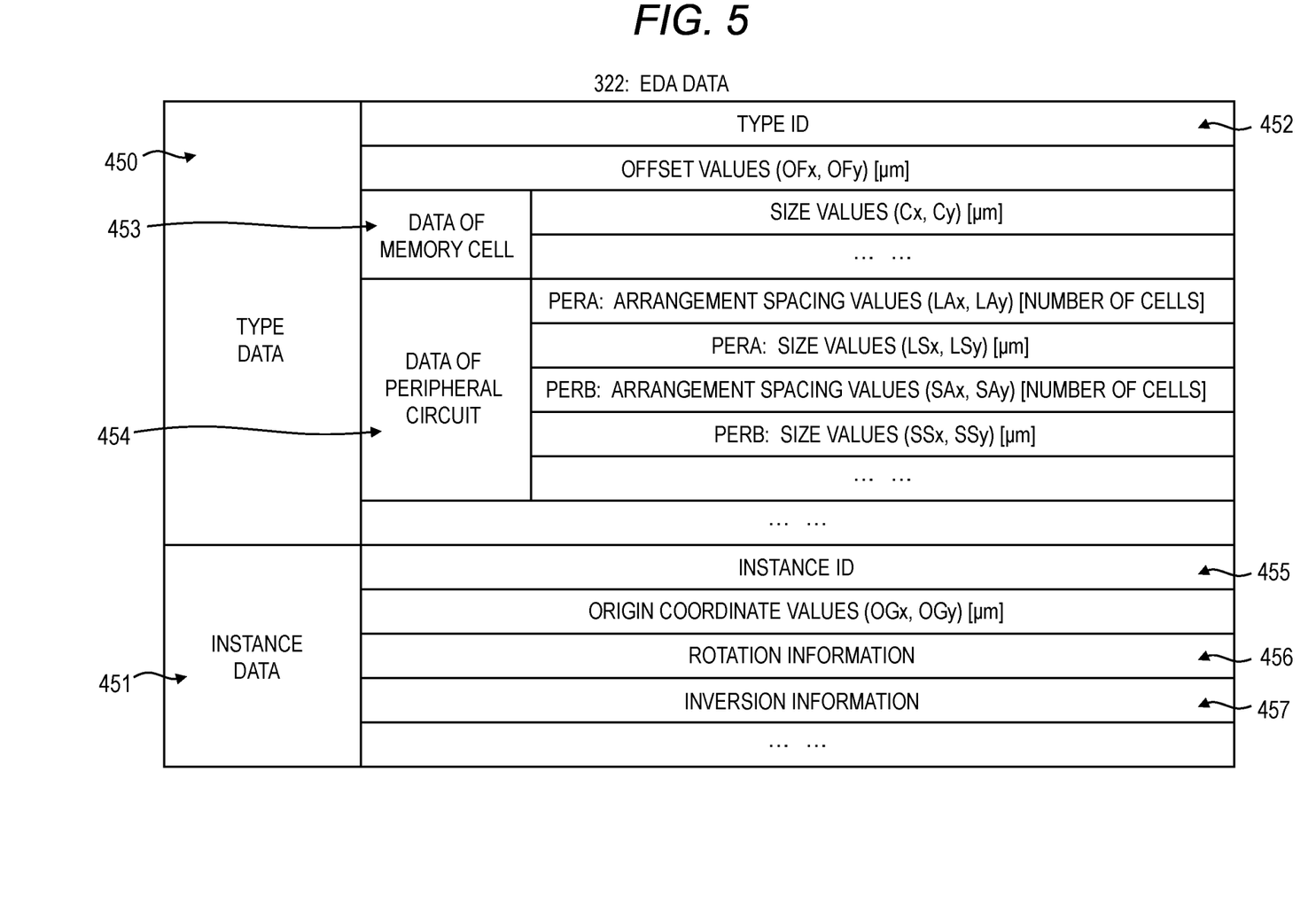
FIG. 5 is a diagram showing an example of EDA data in FIG. 2.

FIG. 5 is a diagram showing an example of the EDA data in FIG. 2. The EDA data 322 includes type data 450 of the memory circuit and instance data 451 of the memory circuit. The type data 450 includes a type ID 452, the offset values (OFx, OFy) [μm] shown in FIG. 4, data 453 of the memory cell MC, and data 454 of the peripheral circuits. The type data 450 is data for defining offset values (OFx, OFy), the data 453 of the memory cell MC, the data 454 of the peripheral circuits, and the like for each type ID 452.

The data 453 of the memory cell MC includes the size values (Cx, Cy) [μm] of the memory cell MC. The data 454 of the peripheral circuits includes the size values and the arrangement spacing values of the peripheral circuits. Specifically, the data 454 of the peripheral circuits includes the size values (LSx, LSy) [μm] and the arrangement spacing values (LAx, LAy) [the number of cells] of the large-scale peripheral circuit PERA, and the size values (SSx, SSy) [μm] and the arrangement spacing values (SAx, SAy) [the number of cells] of the small-scale peripheral circuit PERB.

Here, the arrangement spacing values (LAx, LAy) of the large-scale peripheral circuit PERA and the arrangement spacing values (SAx, SAy) of the small-scale peripheral circuit PERB, for example, are determined not in units of length such as μm, but in units of the number of memory cells MC. Specifically, the arrangement spacing values (LAx, LAy) of the large-scale peripheral circuit PERA are determined by the number of memory cells MC included between adjacent large-scale peripheral circuits PERA in one direction. Similarly, the arrangement spacing values (SAx, SAy) of the small-scale peripheral circuit PERB are determined by the number of memory cells MC included between adjacent small-scale peripheral circuits PERB in one direction. As a result, exact physical coordinate values can be calculated using common arithmetic expressions for the memory circuits having various type IDs, as will be described in detail later.

The instance data 451 includes an instance ID 455, the origin coordinate values (OGx, OGy) [μm] shown in FIG. 4, rotation information 456, and inversion information 457. The instance data 451 is data for defining origin coordinate values (OGx, OGy), the rotation information 456, and the like for each instance ID 455.

For example, when there is a memory circuit having a certain type ID 452 and instance ID 455, the origin coordinate values (OGx, OGy) of the memory circuit are determined by the instance data 451, and the offset values (OFx, OFy) of the memory circuit are determined by the type data 450. Further, for example, when a plurality of memory circuits are mounted in the semiconductor device, each memory circuit has a different instance ID from each other and has different origin coordinate values (OGx, OGy) from each other.

The rotation information 456 indicates the arrangement direction of the memory circuit in the coordinate system of the semiconductor device. For example, in the coordinate system of the semiconductor device, there is a case where the memory circuit is arranged by rotating 90 degrees clockwise or counterclockwise, or by rotating 180 degrees. The rotation information 456 indicates such information. The inversion information 457 indicates the inversion direction of the line symmetry of the memory circuit in the coordinate system of the semiconductor device. For example, in the coordinate system of the semiconductor device, there is a case where the memory circuit is arranged by inverting the left and right or up and down. The inversion information 457 indicates such information.

Figure 6:
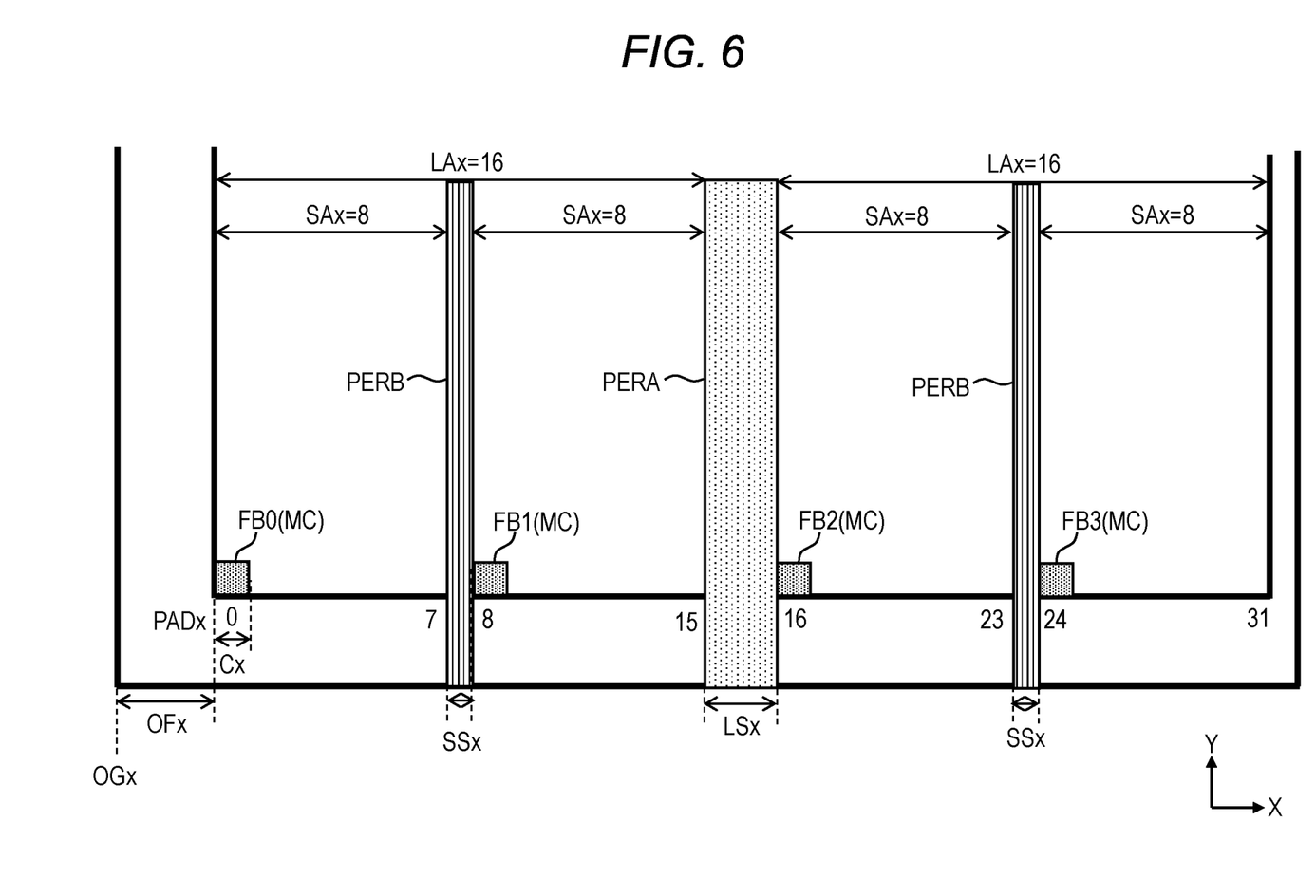
FIG. 6 is a diagram explaining an example of detailed processing of a physical coordinate conversion unit of FIG. 2.

FIG. 6 is a diagram explaining an example of detailed processing of the physical coordinate conversion unit of FIG. 2. The physical coordinate conversion unit 312 converts the physical addresses (PADx, PADy) obtained by the physical address conversion unit 311 into the physical coordinate values (XF, YF) [μm] by calculating Equations 1 and 2 using the EDA data 322 as shown in FIG. 5. FIG. 6 shows a specific example of calculating the physical coordinate value XF in the X-axis direction. The physical coordinate value YF in the Y-axis direction can be calculated in the same manner.

$$XF = OGx + OFx + (PADx \times Cx) + (PADx/LAx \times LSx) + [\{(PADx/SAx) - (PADx/LAx)\} \times SSx] \quad \text{[Equation 1]}$$

$$YF = OGy + OFy + (PADy \times Cy) + (PADy/LAy \times LSy) + [\{(PADy/SAy) - (PADy/LAy)\} \times SSy] \quad \text{[Equation 2]}$$

In Equation 1 and FIG. 6, OGx is the origin coordinate value [μm] of the memory circuit in the X-axis direction. OFx is the offset value [μm] between the coordinate value of the memory cell MC in which the physical address PADx in the row direction is 0 and the origin coordinate value OGx. Cx is the size value [μm] of the memory cell MC in the X-axis direction. LAx is the arrangement spacing value [the number of cells] of the large-scale peripheral circuit PERA in the X-axis direction. LSx is the size value [μm] of the large-scale peripheral circuit PERA in the X-axis direction. SAx is the arrangement spacing value [the number of cells] of the small-scale peripheral circuit PERB in the X-axis direction. SSx is the size value [μm] of the small-scale peripheral circuit PERB in the X-axis direction.

Similarly, in Equation 2, OGy is the origin coordinate value [μm] of the memory circuit in the Y-axis direction. OFy is the offset value [μm] between the coordinate value of the memory cell MC in which the physical address PADy in the column direction is 0 and the origin coordinate value OGy. Cy is the size value [μm] of the memory cell MC in the Y-axis direction. LAy is the arrangement spacing value [the number of cells] of the large-scale peripheral circuit PERA in the Y-axis direction. LSy is the size value [μm] of the large-scale peripheral circuit PERA in the Y-axis direction. SAy is the arrangement spacing value [the number of cells] of the small-scale peripheral circuit PERB in the Y-axis direction. SSy is the size value [μm] of the small-scale peripheral circuit PERB in the Y-axis direction.

As shown in FIG. 5, each parameter in Equations 1 and 2 is included in the EDA data 322. For example, the physical coordinate conversion unit 312 acquires each parameter by referring to the EDA data 322 based on the type ID and the instance ID associated with the physical addresses (PADx, PADy). Hereinafter, a specific example when calculating the physical coordinate value XF of the fail bit in the X-axis direction will be described with reference to FIG. 6 and Equation 1.

In Equation 1, (PADxxCx) indicates the total size of the memory cells MC included in the range from PADx=0 to PADx=PADx. Further, in Equation 1, the operation symbol "/" indicates a quotient operation. (PADx/LAx) and {(PADx/SAx)−(PADx/LAx)} indicate the number of large-scale peripheral circuits PERA and the number of small-scale peripheral circuits PERB included in the range of PADx=0 to PADx=PADx, respectively. For example, if a large-scale peripheral circuit PERA is included, the physical coordinate value XF will be shifted by the amount obtained by multiplying the number by the size value LSx of the large-scale peripheral circuit PERA. The same applies to the small-scale peripheral circuit PERB.

In the example of FIG. 6, LAx=16 and SAx=8, and the physical addresses PADx of the fail bits FB0, FB1, FB2, and FB2 are 0, 8, 16, and 24, respectively. (PADx/LAx) and {(PADx/SAx)−(PADx/LAx)} are both 0 for the fail bit FB0, 0 and 1 for the fail bit FB1, both 1 for the fail bit FB2, and 1 and 2 for the fail bit FB3. Thus, as can be seen from FIG. 6, it is possible to exactly calculate the physical coordinate value XF of the fail bits FB0, FB1, FB2, and FB2 in the X-axis direction.

Furthermore, since Equations 1 and 2 define the arrangement interval values of the peripheral circuit using the number of cells, they can be commonly applied to memory circuits 400a, 400b, and 400c of various arrangement types as shown in FIG. 4, that is, memory circuits of various type IDs. For example, when applied to the memory circuit 400a, the arrangement spacing value LAx of the large-scale peripheral circuit PERA in the X-axis direction in FIG. 5 is set to the total number of memory cells MC provided in the X-axis direction, and the arrangement spacing value LAy in the Y-axis direction is set to the total number of memory cells MC provided in the Y-axis direction. Thus, the number of large-scale peripheral circuits PERA in Equations 1 and 2 is fixed to 0. As a result, the physical coordinate values (XF, YF) can be correctly calculated.

In addition, when applied to the memory circuit 400b, the physical coordinate value XF in the X-axis direction is calculated in the same manner as in the case of FIG. 6 by correctly setting the parameter relating to the X-axis direction in the data 452 of the peripheral circuit in FIG. 5. On the other hand, the arrangement spacing value LAy of the large-scale peripheral circuit PERA in the Y-axis direction in FIG. 5 is set to the total number of memory cells MC provided in the Y-axis direction. Thus, the number of large-scale peripheral circuits PERA in Equation 2 is fixed to 0. As a result, the physical coordinate values (XF, YF) can be correctly calculated.

Further, when applied to the memory circuit 400c, the physical coordinate value XF in the X-axis direction and the physical coordinate value YF in the Y-axis direction are calculated in the same manner as in the case of FIG. 6 by correctly setting the parameters in the X-axis direction and the Y-axis direction in the data 452 of the peripheral circuit in FIG. 5. As a result, the physical coordinate values (XF, YF) can be correctly calculated. When calculating the physical coordinate values (XF, YF), the physical coordinate conversion unit 312 may reflect the rotation information 456 or the inversion information 457 in the EDA data 322 of FIG. 5. Specifically, the physical coordinate conversion unit 312 may perform, in the rotation direction or the inversion direction, coordinate conversion processing on the calculated physical coordinate values (XF, XY) based on the rotation information 456 or the inversion information 457.

Figure 7:
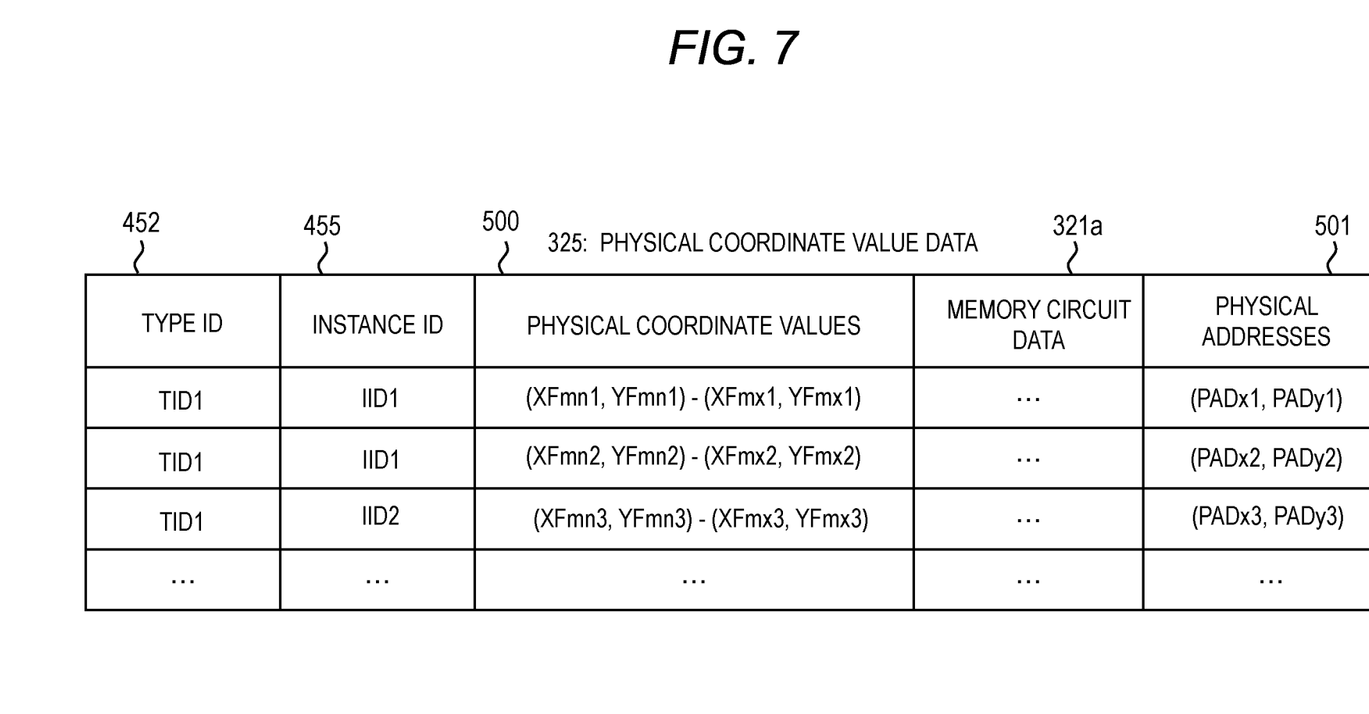
FIG. 7 is a diagram showing an example of physical coordinate value data in FIG. 2.

FIG. 7 is a diagram showing an example of the physical coordinate value data in FIG. 2. As shown in FIG. 7, the physical coordinate value data 325 includes, for example, physical addresses 501 serving as a conversion source in the physical coordinate conversion unit 312, and physical coordinate values 500 serving as a conversion destination. Further, the physical coordinate value data 325 includes the type ID 452 and the instance ID 455 of the memory circuit corresponding to the physical addresses 501, and the memory circuit data 321a.

In this example, the physical coordinate values 500 are indicated by a coordinate range on a rectangular having a minimum value of (XFmn, YFmn) and a maximum value of (XFmx, YFmx). This coordinate range is a coordinate range occupied by the fail bit, that is, the memory cell MC. As can be seen from FIG. 6, the physical coordinate conversion unit 312 can calculate this coordinate range using the size values Cx and Cy of the memory cell MC. The memory circuit data 321a is a part of various data included in the memory circuit data 321 of FIG. 2. Specifically, the memory circuit data 321a is basic configuration information such as, for example, the capacity of the memory circuit, the number of addresses in the row direction, the number of addresses in the column direction, the number of I/Os, the presence or absence of the redundant circuit, and the like.

Details of Display Control Unit

Figure 8:
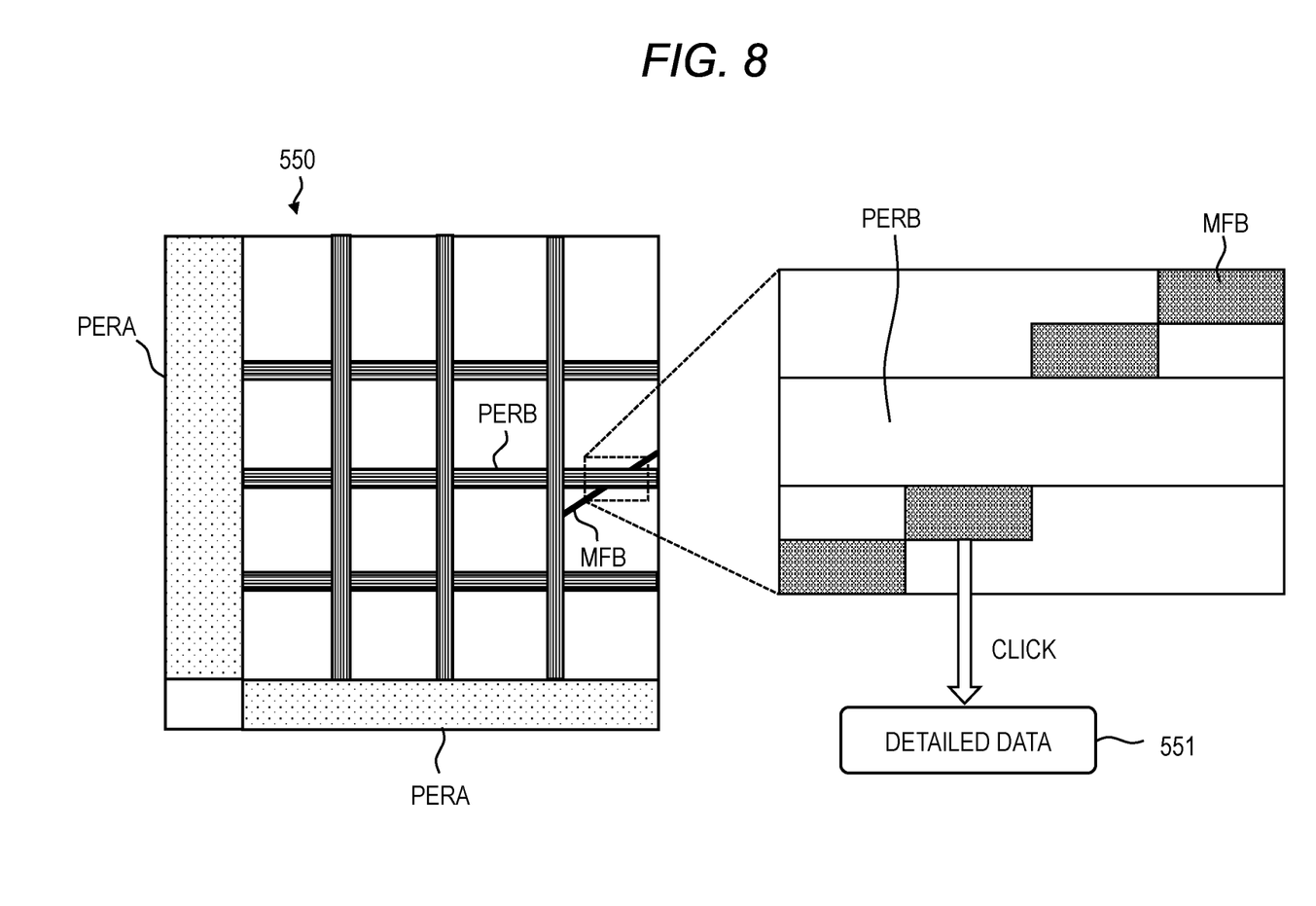
FIG. 8 is a schematic diagram showing an example of display by a display device in FIG. 2.

FIG. 8 is a schematic diagram showing an example of display by the display device in FIG. 2. As shown in FIG. 8, the display control unit 313 causes the display device 330 to display a layout 550 of the semiconductor device. Further, the display control unit 313 adds a mark MFB of the fail bit to the physical coordinate values 500 in the layout 550 of the semiconductor device based on the physical coordinate values 500 of FIG. 7 obtained by the physical coordinate conversion unit 312.

In FIG. 8, for convenience of description, the mark MFB of the fail bit is represented by a fill superimposed on the layout 550 by taking a case where the fail bits occur in a line in an oblique direction as an example. As shown in FIG. 8, the marks MFB of the fail bits reflect the arrangement of the small-scale peripheral circuit PERB and are displayed in exact coordinate values. The mark MFB of the fail bit can be appropriately changed, for example, represented by a simple frame. Further, in the displayed layout 550, when the user selects one of the marks MFB of the fail bits by, for example, clicking a mouse, the display control unit 313 causes the display device 330 to display detailed data 551 of the selected fail bit.

This detailed data 551 is determined based on, for example, the physical coordinate value data 325 shown in FIG. 7. For example, when the mark MFB having the physical coordinate values 500 of (XFmn1, YFmn1)–(XFmx1, YFmx1) is selected, a part or all of the corresponding type ID "TID1", instance ID "IID1", memory circuit data 321a, and physical addresses (PADx1, PADy1) are displayed. The user can use the detailed data 551 as reference data when performing a physical analysis or the like.

Main Effects of First Embodiment

As described above, by using the method of the first embodiment, it is typically possible to improve the efficiency of the failure analysis. Specifically, since the exact location of the fail bit can be calculated, it is possible to improve the efficiency of the physical analysis on the fail bit in particular. Further, by using the display device 330 to indicate the exact location of the fail bit on the layout of the semiconductor device, the visual effect may allow efficient estimation of the cause of the failure. Furthermore, since the failure analysis can be performed using the general layout tool 328, the user's operability can be improved.

Second Embodiment

Details of Failure Analysis Apparatus

Figure 9:
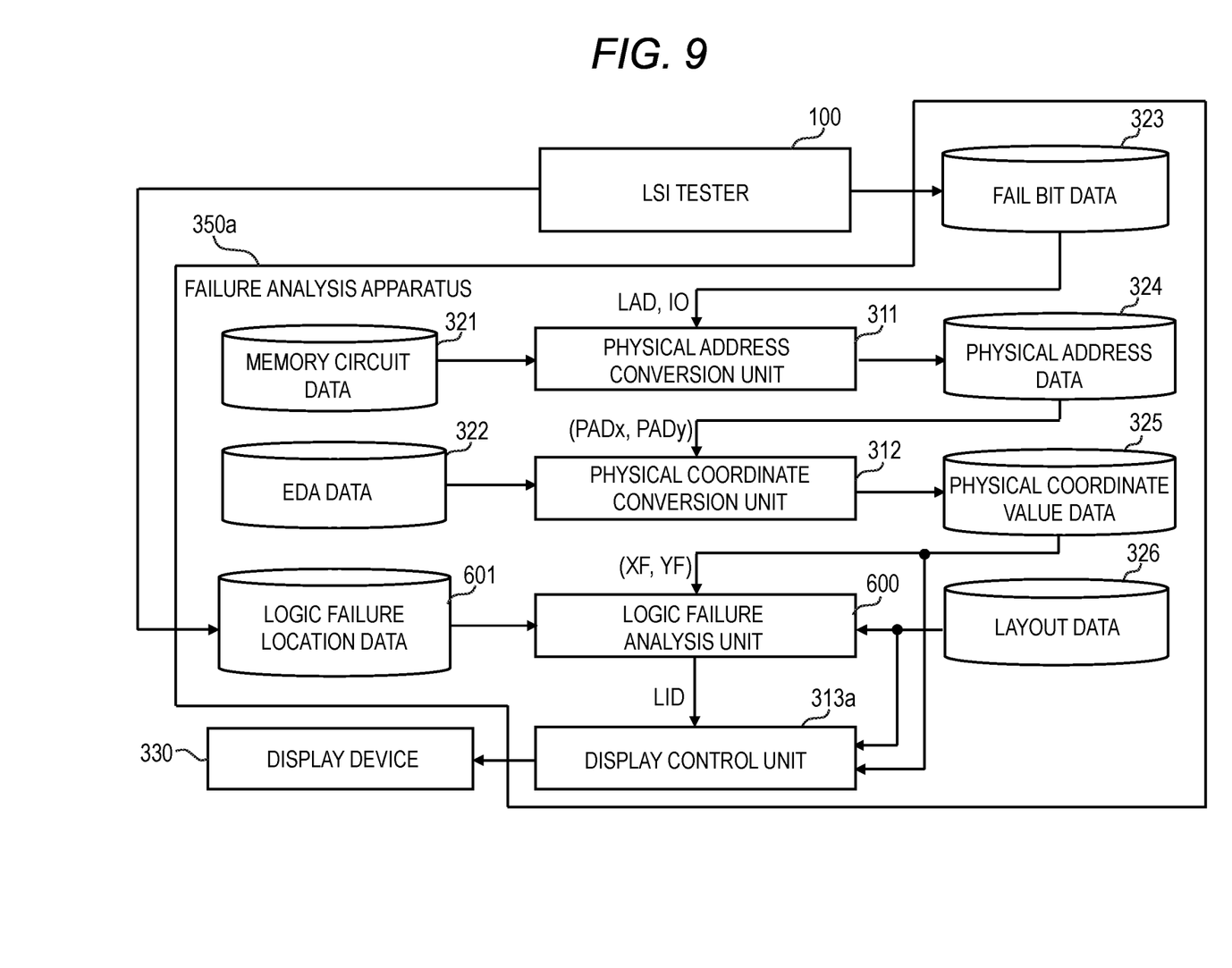
FIG. 9 is a functional block diagram showing an example of a configuration of a failure analysis apparatus according to a second embodiment of the present disclosure.

FIG. 9 is a functional block diagram showing an example of a configuration of a failure analysis apparatus according to a second embodiment of the present disclosure. In a failure analysis apparatus 350a of FIG. 9, the differences from the configuration example of FIG. 2 are in that a logic failure analysis unit 600 and logic failure location data 601 are added, and processing of a display control unit 313a is different. For example, the logic failure analysis unit 600 is realized by the processor 310 of FIG. 1 executing the failure analysis tool 327. The logic failure location data 601 is stored in the storage device 320 of FIG. 1.

Further, the LSI tester 100 is, for example, a System on a Chip (SoC) tester or a tester configured by a combination of a memory tester and a logic tester. The LSI tester 100 tests a logic circuit included in a semiconductor device and generates the logic failure location data 601 that includes information about the logic failure location that results from the test.

Details of Logic Failure Analysis Unit and Display Control Unit

Figure 10:
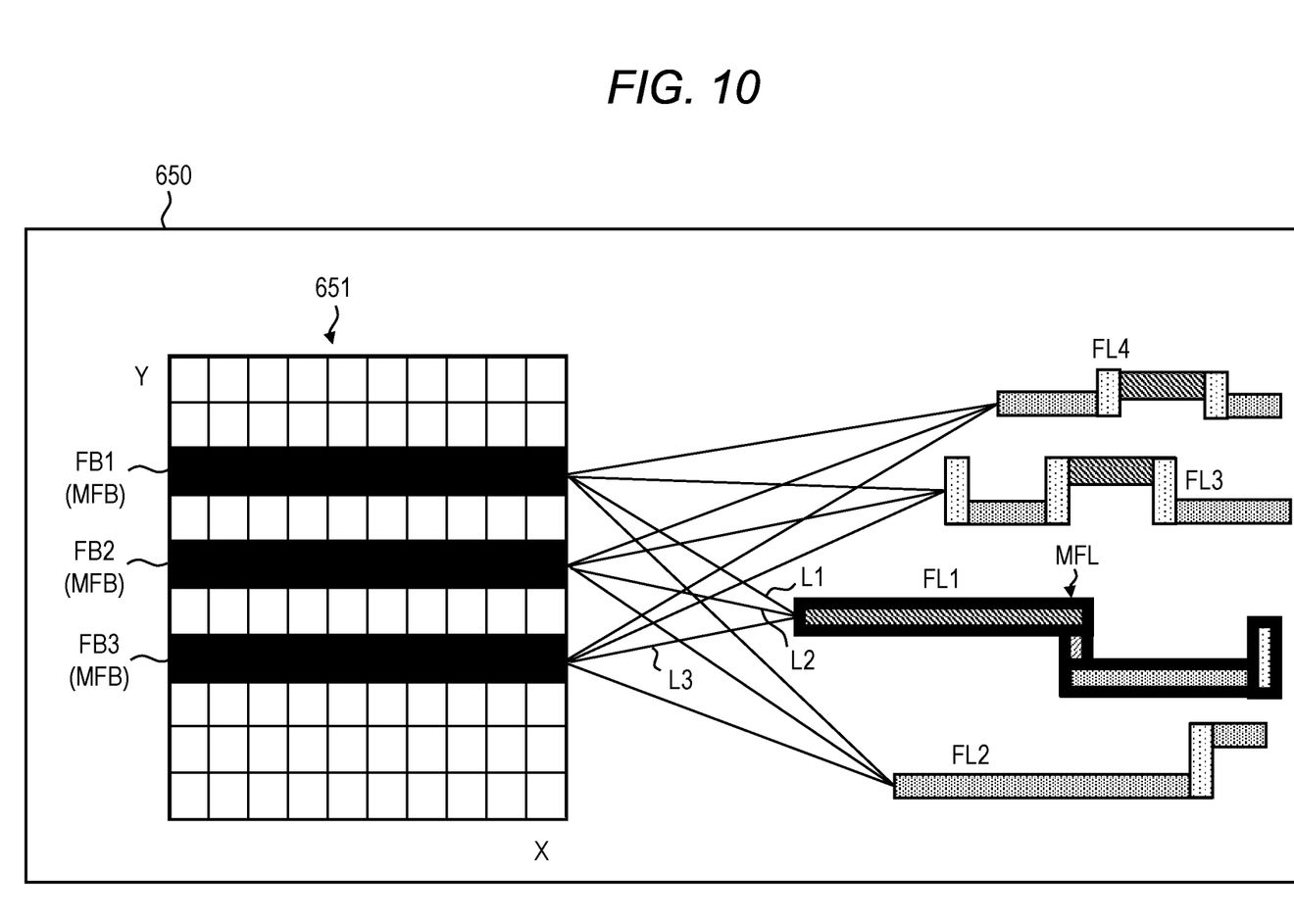
FIG. 10 is a diagram for explaining an example of processing of a logic failure analysis unit and a display control unit in FIG. 9.

FIG. 10 is a diagram for explaining an example of processing of the logic failure analysis unit and the display control unit in FIG. 9. In FIG. 10, a schematic layout 650 of a part of the semiconductor device is shown. The layout 650 includes a schematic layout 651 of a memory circuit including marks MFB of fail bits FB1 to FB3. The layout 651 of the memory circuit is more particularly a layout that includes each peripheral circuit, as shown in FIG. 8.

The layout 650 of FIG. 10 also includes layouts of a plurality of logic failure locations FL1 to FL4 obtained by testing the logic circuit and included in the logic failure location data 601. The logic failure locations FL1 to FL4 are, for example, nets or logic cells. Here, the logic failure analysis unit 600 recognizes the physical coordinate values of each of the plurality of logic failure locations included in the logic failure location data 601 based on the layout data 326. Then, the logic failure analysis unit 600 calculates the distance between each of the physical coordinate values of the fail bits FB1 to FB3 and each of the logic failure locations FL1 to FL4. The physical coordinate values of the fail bits FB1 to FB3 are included in the physical coordinate value data 325.

In FIG. 10, for example, distances L1 to L3 between the logic failure location FL1 and each of the plurality of fail bits FB1 to FB3 are calculated. The same applies to the logic failure locations FL2 to FL4. In addition, here, the case where three fail bits FB1 to FB3, strictly speaking, three fail bit lines are generated is illustrated, but the fail bit line may be one. When there is a plurality of fail bit lines, the logic failure analysis unit 600 calculates, for example, the total distance of the calculated plurality of distances L1 to L3.

Then, the logic failure analysis unit 600 extracts, from the plurality of logic failure locations FL1 to FL4, the logic failure location having the shortest distance to the fail bits FB1 to FB3, in detail, the shortest total distance to the fail bits FB1 to FB3. In the example of FIG. 10, the logic failure location having the shortest total distance is the logic failure location FL1. The logic failure analysis unit 600 transmits identification information LID of the extracted logic failure location to the display control unit 313a. The identification information LID may be, for example, a net name, a logic cell name, or the like.

The display control unit 313a adds a mark MFB of the fail bit to the layout 650 of the semiconductor device in the same manner as the first embodiment. In addition, the display control unit 313a adds a mark MFL to the extracted logic failure location FL1 in the layout 650 of the semiconductor device, as shown in FIG. 10, based on the identification information LID of the logic failure location. In this case, the outer frame of the logic failure location FL1 is highlighted as the mark MFL. Here, the logic failure analysis unit 600 extracts the logic failure location having the shortest total distance, but in addition thereto, for example, the logic failure locations having the second shortest total distance and the third shortest total distance may be extracted.

Here, it is desirable that the fail bits FB1 to FB3 to be processed are line-shaped fail bits as shown in FIG. 10. Specifically, there may be a plurality of fail bits connected to the same word line WL, or a plurality of fail bits connected to the same bit line BL. If there is such a line-shaped fail bit, the cause of the failure may not exist in the memory circuit but may exist in, for example, the logic circuit arranged around the memory circuit. In this case, in particular, there is a high possibility that the cause exists in the logic failure location having the shortest distance to the fail bit. Therefore, it is advantageous to provide the logic failure analysis unit 600.

Main Effects of Second Embodiment

As described above, even when the method of the second embodiment is used, it is possible to improve the efficiency of the failure analysis. Specifically, for example, the cause of the failure of the memory circuit can be estimated including the surrounding logic circuit, and there is a possibility that the cause that cannot be obtained by the failure analysis of only the memory circuit can be identified. Further, in this case, it is possible to narrow down the candidates for specific failure locations in the logic circuit by calculating the distance. This effect is obtained by being able to exactly calculate the physical coordinate values of the fail bits in the memory circuit.

Although the invention made by the present inventor has been specifically described based on the embodiments, the present invention is not limited to the embodiments described above, and it is needless to say that various modifications can be made without departing from the gist thereof.

For example, in the failure analysis apparatus 350 or 350a shown in FIG. 2 or FIG. 9, a part or all of the configuration elements are not limited to program processing by a processor but may be implemented in other forms. For example, a part or all of the physical address conversion unit 311, the physical coordinate conversion unit 312, the logic failure analysis unit 600, and the display control units 313 and 313a may be implemented by hardware such as a Field Programmable Gate Array (FPGA) and an Application Specific Integrated Circuit (ASIC), or may be implemented by a combination of software and hardware.

What is claimed is:

1. A failure analysis apparatus which analyzes a failure of a semiconductor device which includes a memory circuit, the failure analysis apparatus comprising:

a storage device configured to store Electronic Design Automation (EDA) data which includes size values of a memory cell in the memory circuit, size values of a peripheral circuit in the memory circuit and arrangement spacing values of the peripheral circuit, and layout data of the semiconductor device; and a processor, wherein the processor is configured to:
  convert logical addresses and an Input/Output (I/O) value of a fail bit obtained by testing the memory circuit into physical addresses using predetermined arithmetic expressions; and
  convert the physical addresses into physical coordinate values using the size values of the memory cell, the size values of the peripheral circuit and the arrangement spacing values of the peripheral circuit.

2. The failure analysis apparatus according to claim 1, wherein the processor is further configured to:
  cause a display device to display a layout of the semiconductor device based on the layout data in the storage device; and
  add a mark of the fail bit to the physical coordinate values in the layout of the semiconductor device.

3. The failure analysis apparatus according to claim 1, wherein the arrangement spacing values of the peripheral circuit are determined by a number of memory cells included between adjacent peripheral circuits.

4. The failure analysis apparatus according to claim 1,
  wherein the peripheral circuit comprises a first peripheral circuit,
  wherein the size values of the peripheral circuit comprise first size values,
  wherein the arrangement spacing values of the peripheral circuit comprise first arrangement spacing values,
  wherein the EDA data further includes second size values of a second peripheral circuit in the memory circuit and second arrangement spacing values of the second peripheral circuit, and
  wherein the second peripheral circuit includes a tap cell for supplying a power supply potential to a well of the semiconductor device.

5. The failure analysis apparatus according to claim 1, wherein the EDA data includes reference coordinate values indicating a location of a memory array in the memory circuit in semiconductor device.

6. The failure analysis apparatus according to claim 1, further comprising a logic circuit,
  wherein the processor is further configured to:
    recognize physical coordinate values of each of a plurality of logic failure portions obtained by testing the logic circuit; and
    calculate a distance between the physical coordinate values of each of the plurality of logic failure portions and the physical coordinate values of the fail bit.

7. The failure analysis apparatus according to claim 6, wherein the processor is further configured to extract, from the plurality of logic failure portions, the logic failure portion having a shortest distance to the fail bit.

8. A non-transitory computer readable recording medium storing a program for causing a computer to execute processing analyzing a failure of a semiconductor device including a memory circuit, the processing comprising:
  acquiring logical addresses and an Input/Output (I/O) value of a fail bit obtained by testing the memory circuit;
  converting the logical addresses and the I/O value into physical addresses using predetermined arithmetic expressions;
  acquiring Electronic Design Automation (EDA) data including size values of a memory cell in the memory circuit, size values of a peripheral circuit in the memory circuit and arrangement spacing values of the peripheral circuit; and
  converting the physical addresses into physical coordinate values using the size values of the memory cell, the size values of the peripheral circuit and the arrangement spacing values of the peripheral circuit.

9. The non-transitory computer readable recording medium according to claim 8, wherein the arrangement spacing values of the peripheral circuit are determined by a number of memory cells included between adjacent peripheral circuits.

10. The non-transitory computer readable recording medium according to claim 8, wherein the EDA data includes reference coordinate values indicating a location of a memory array in the memory circuit in semiconductor device.

11. A failure analysis method of a semiconductor device including a memory circuit, the failure analysis method comprising:
  storing Electronic Design Automation (EDA) data which includes size values of a memory cell in the memory circuit, size values of a peripheral circuit in the memory circuit and arrangement spacing values of the peripheral circuit, and layout data of the semiconductor device;
  converting logical addresses and an Input/Output (I/O) value of a fail bit obtained by testing the memory circuit into physical addresses using predetermined arithmetic expressions; and
  converting the physical addresses into physical coordinate values using the size values of the memory cell, the size values of the peripheral circuit and the arrangement spacing values of the peripheral circuit.

12. The failure analysis method according to claim 11, further comprising:
  causing a display device to display a layout of the semiconductor device based on the layout data in the storage device; and
  adding a mark of the fail bit to the physical coordinate values in the layout of the semiconductor device.

13. The failure analysis method according to claim 11, wherein the arrangement spacing values of the peripheral circuit are determined by a number of memory cells included between adjacent peripheral circuits.

14. The failure analysis method according to claim 11, wherein the EDA data includes reference coordinate values indicating a location of a memory array in the memory circuit in semiconductor device.

15. The failure analysis method according to claim 11, further comprising:
  recognizing physical coordinate values of each of a plurality of logic failure portions obtained by testing a logic circuit included in the semiconductor device; and
  calculating a distance between the physical coordinate values of each of the plurality of logic failure portions and the physical coordinate values of the fail bit.

* * * * *